US009520227B2

(12) United States Patent
Herglotz et al.

(10) Patent No.: US 9,520,227 B2
(45) Date of Patent: Dec. 13, 2016

(54) APPARATUS FOR CONTACTLESS TRANSMISSION OF ELECTRICAL ENERGY BETWEEN A WALL AND A DOOR LEAF/WINDOW SASH FASTENED TO SAID WALL

(75) Inventors: Tibor Herglotz, Kreuzau (DE); Ingo Steinfeld, Langenfeld (DE)

(73) Assignee: DR. HAHN GMBH & CO. KG, Moenchengladbach-Wickrath (DE)

( * ) Notice: Subject to any disclaimer, the term of this patent is extended or adjusted under 35 U.S.C. 154(b) by 496 days.

(21) Appl. No.: 14/119,446

(22) PCT Filed: May 3, 2012

(86) PCT No.: PCT/EP2012/058125
§ 371 (c)(1),
(2), (4) Date: Nov. 22, 2013

(87) PCT Pub. No.: WO2012/159857
PCT Pub. Date: Nov. 29, 2012

(65) Prior Publication Data

US 2014/0077618 A1 Mar. 20, 2014

(30) Foreign Application Priority Data

May 24, 2011 (EP) .................................... 11167265

(51) Int. Cl.
*H01F 27/42* (2006.01)
*H01F 37/00* (2006.01)
(Continued)

(52) U.S. Cl.
CPC ........... *H01F 38/14* (2013.01); *E05D 11/0081* (2013.01); *E05D 2003/025* (2013.01);
(Continued)

(58) Field of Classification Search
CPC .................. H01F 38/14; H01F 27/2823; H01F 2027/2809; H01F 27/2804; H01F 17/0006; H01F 27/006; H01F 27/02; H01F 27/24; H01F 27/29; H01F 27/362; H01F 27/365; H01F 41/041; H01F 5/003
(Continued)

(56) References Cited

U.S. PATENT DOCUMENTS 3,842,386 A * 10/1974 Suska .................... H01R 35/02 174/86
4,412,711 A 11/1983 Suska
(Continued)

FOREIGN PATENT DOCUMENTS

CN 1781168 A 5/2006
DE 39 15 812 A1 11/1990
(Continued)

*Primary Examiner* — Jared Fureman
*Assistant Examiner* — Esayas Yeshaw
(74) *Attorney, Agent, or Firm* — Norman B. Thot

(57) ABSTRACT

An apparatus for a contactless transmission of electrical energy between a wall and a door leaf/window sash fastened to the wall in an articulated fashion via hinges about a hinge axis includes a primary coil configured to be fastened to the wall, a secondary coil fastened to the door leaf/window sash, and a hinge bolt as a magnetic flux conduction body between the primary coil and the secondary coil. The hinge bolt comprises at least one flux element provided as a prefabricated structural component and at least one bearing piece comprising a mating frontal side. The at least one flux element comprises at least one frontal side. The at least one frontal side of the at least one flux element braces against the mating frontal side of the at least one bearing piece.

33 Claims, 5 Drawing Sheets

(51) Int. Cl.
*H01F 38/14* (2006.01)
*E05D 11/00* (2006.01)
*E05D 3/02* (2006.01)

(52) U.S. Cl.
CPC ... *E05Y 2900/132* (2013.01); *E05Y 2900/148* (2013.01); *Y10T 16/557* (2015.01)

(58) Field of Classification Search
USPC .......................................................... 307/104
See application file for complete search history.

(56) References Cited

U.S. PATENT DOCUMENTS 8,627,547 B2 * 1/2014 Soh .................... E05D 11/0081 16/298
9,287,705 B2 * 3/2016 Meyer ................. E05D 11/0081
2004/0187387 A1 * 9/2004 Hedrich .................. E05F 15/42 49/25
2007/0076459 A1 4/2007 Limpkin
2009/0243397 A1 * 10/2009 Cook ...................... H02J 5/005 307/104
2012/0017396 A1 1/2012 Meyer
2012/0066864 A1 3/2012 Boegel-Poetter et al.
2012/0235788 A1 * 9/2012 Lakirovich ............. H02J 5/005 340/5.64
2012/0261927 A1 * 10/2012 Gilpatrick ............... H01F 38/14 290/40 B

FOREIGN PATENT DOCUMENTS

DE 203 05 769 U1 10/2003
DE 10 2004 017 341 A1 1/2005
DE 20 2008 014 318 U1 4/2010
JP 9-317346 A 12/1997
WO WO 2010/139515 A1 12/2010

* cited by examiner

APPARATUS FOR CONTACTLESS TRANSMISSION OF ELECTRICAL ENERGY BETWEEN A WALL AND A DOOR LEAF/WINDOW SASH FASTENED TO SAID WALL

CROSS REFERENCE TO PRIOR APPLICATIONS

This application is a U.S. National Phase application under 35 U.S.C. §371 of International Application No. PCT/EP2012/058125, filed on May 3, 2012 and which claims benefit to European Patent Application No. 11167265.5, filed on May 24, 2011. The International Application was published in German on Nov. 29, 2012 as WO 2012/159857 A1 under PCT Article 21(2).

FIELD

The present invention relates to an apparatus for a contactless transmission of electrical energy between a wall and a door leaf/window sash fastened to the wall in an articulated fashion using hinges about a hinge axis, in which a primary coil fastened to the wall and a secondary coil fastened to the door leaf/window sash are provided that form an inductive operative connection with the aid of a hinge bolt.

BACKGROUND

The leaves and sashes of doors and windows on real properties, such as houses, business premises or production facilities, increasingly include means that improve safety and comfort, and any given current operating state of which is monitored or actuated from outside of the door/window, and any changes related to the operating state or any signals that may have been received from the sensors are transmitted to the monitoring or actuating means.

Reference is made, for example, to a burglar alarm system that is installed in a building and communicates with means that are provided on the door/window for monitoring, for example, access, breach, closure, tampering or sabotage or a motor-driven lock to a facility.

Multi-wire cables are used in the prior art for transmitting the corresponding signals and to provide electrical conducting lines between the monitoring means and the means disposed on the door/window, which are flexibly routed between the door leaf/window sash and often provided with a flexible metal hose for protection.

These cable transitions considerably compromise the optical appearance and can become jammed in the door or window when the door leaf/window sash is closed, resulting in damage or even destruction of the cables. The cable transitions are furthermore points of vulnerability in terms of possible tampering, which is why so-called Z-wiring of the sensors or contacts is also implemented in the cable transition to protect against sabotage.

DE 10 2004 017 341 A1 describes a flap hinge with a transformer incorporated therein to provide a contactless energy transmission. This flap hinge comprises a primary coil that is disposed in a part of the frame of the flap hinge and a secondary coil that is disposed in a part of the door leaf/window sash of the hinge flap. Serving as a magnetic coupling for the secondary coil with the primary coil, which are disposed at a distance relative to each other in the direction of the hinge axis, is a ferrite core that traverses both coils and simultaneously constitutes the hinge bolt.

Although the contactless transmission of energy from a stationary frame to a door leaf/window sash, that is pivotably disposed inside the frame, is desirable to avoid the aforementioned disadvantages, experiments have shown that, using the hinge flap according to the class of the prior art as described in DE 10 2004 017 341 A1, it is only possible to transmit very small electrical outputs from the primary to the secondary side because the incidence of power leakage is very high during the transmission.

SUMMARY

An aspect of the present invention is to provide an apparatus according to the class with a hinge bolt that improves the inductive operative connection between the primary and secondary coils.

In an embodiment, the present invention provides an apparatus for a contactless transmission of electrical energy between a wall and a door leaf/window sash fastened to the wall in an articulated fashion via hinges about a hinge axis which includes a primary coil configured to be fastened to the wall, a secondary coil configured to be fastened to the door leaf/window sash, and a hinge bolt configurable as a magnetic flux conduction body between the primary coil and the secondary coil. The hinge bolt comprises at least one flux element provided as a prefabricated structural component and at least one bearing piece comprising a mating frontal side. The at least one flux element comprises at least one frontal side. The at least one frontal side of the at least one flux element is configured to brace against the mating frontal side of the at least one bearing piece.

BRIEF DESCRIPTION OF THE DRAWINGS

The present invention is described in greater detail below on the basis of embodiments and of the drawings in which.

DETAILED DESCRIPTION

Figure 1:
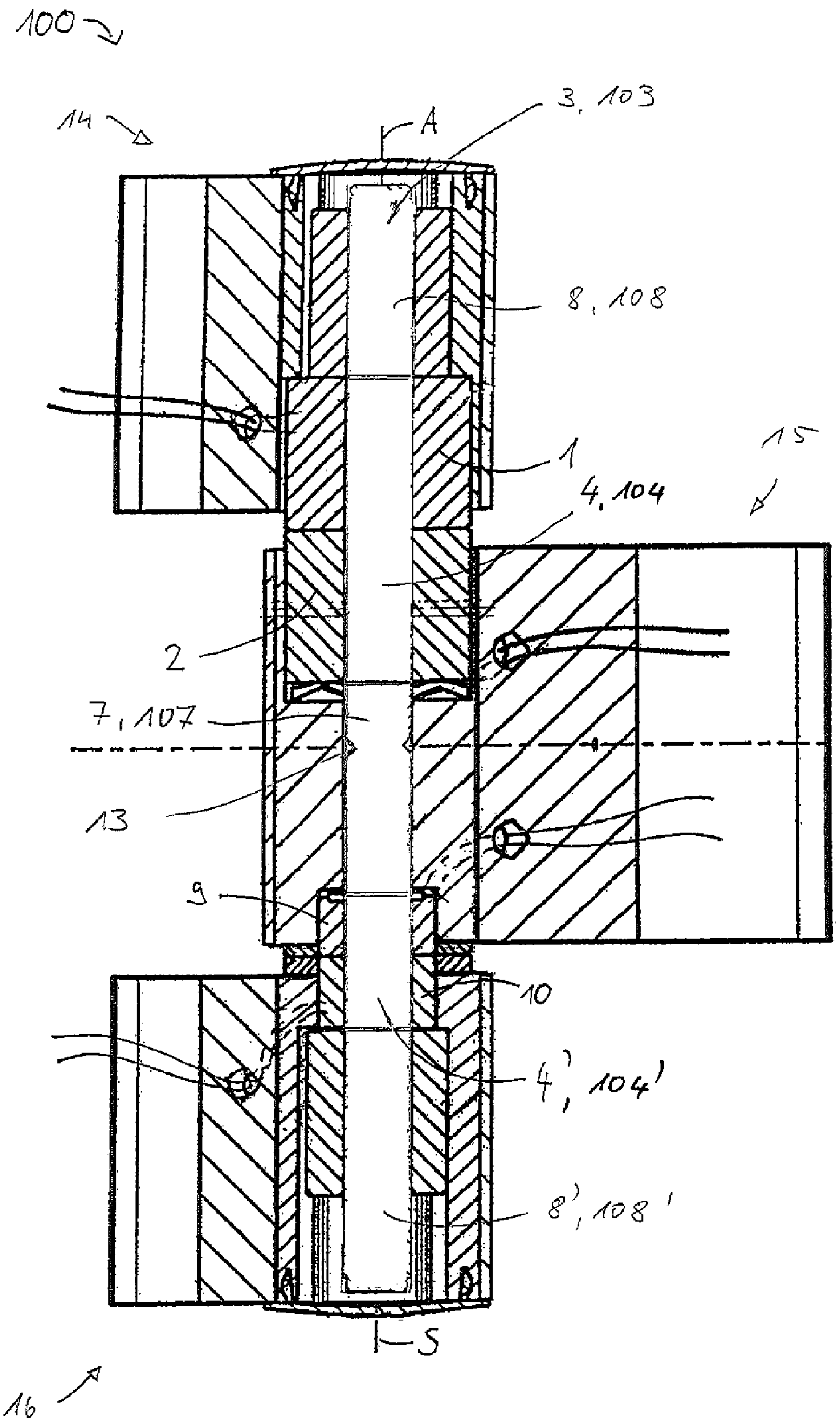
FIG. 1 is a representation of a schematic view of an apparatus according to the present invention, partially by way of a longitudinal section.
Figure 2:
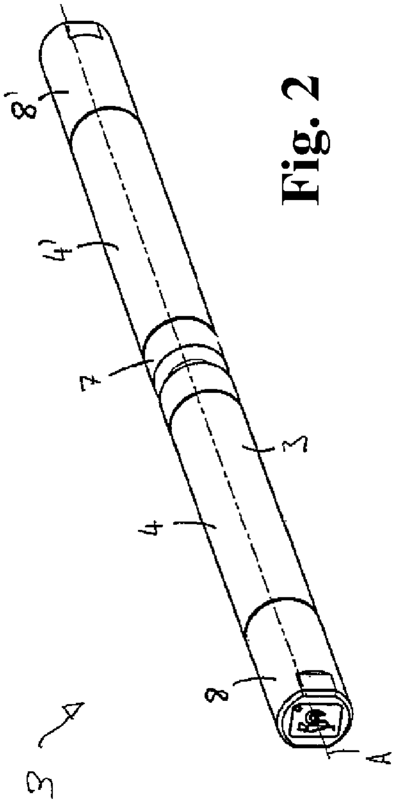
FIG. 2 is a representation of a perspective view of an embodiment of a hinge bolt of an apparatus according to the present invention.
Figure 3:
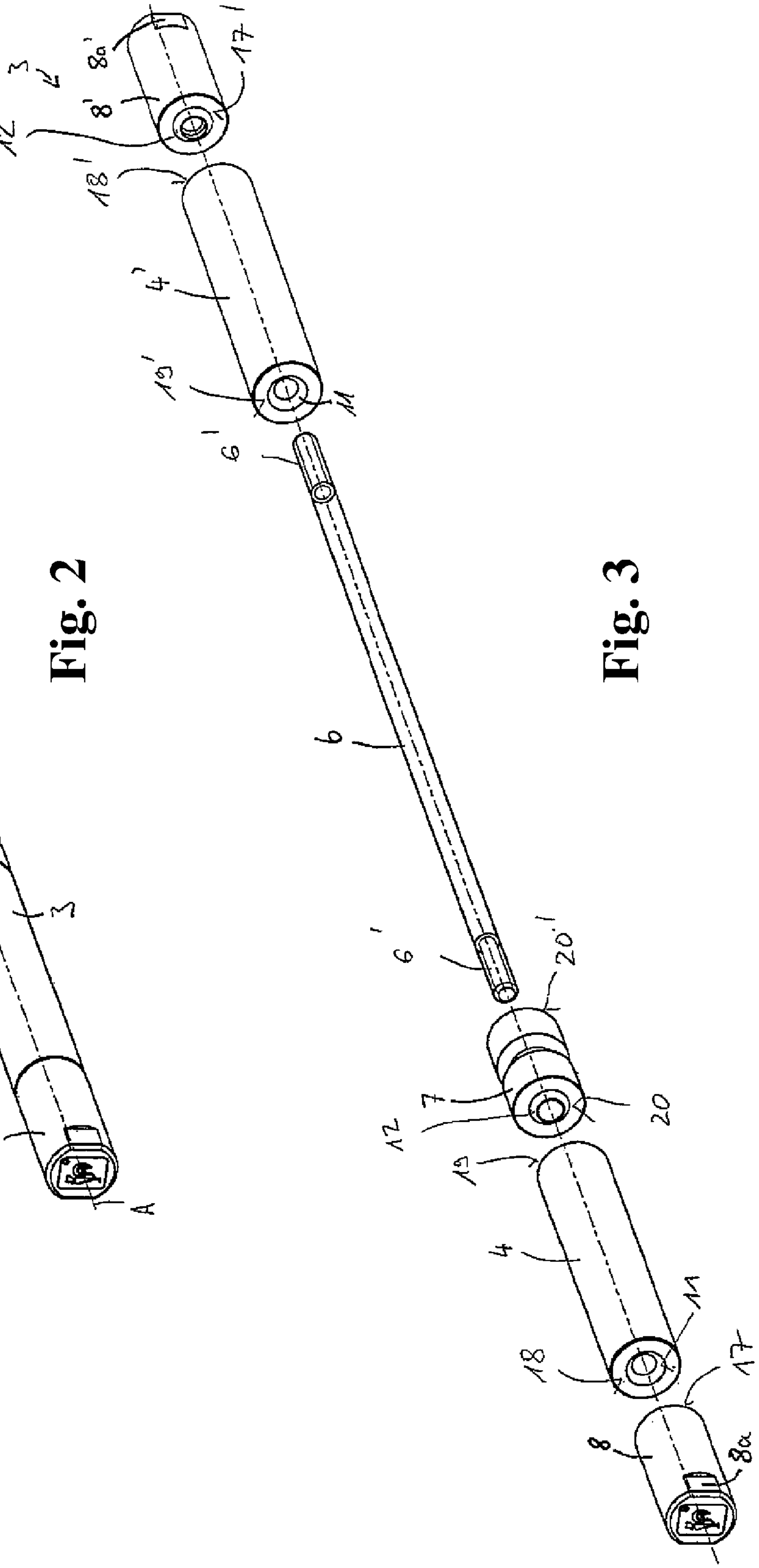
FIG. 3 is a view as shown in FIG. 2, however, seen as an exploded view.
Figure 4:
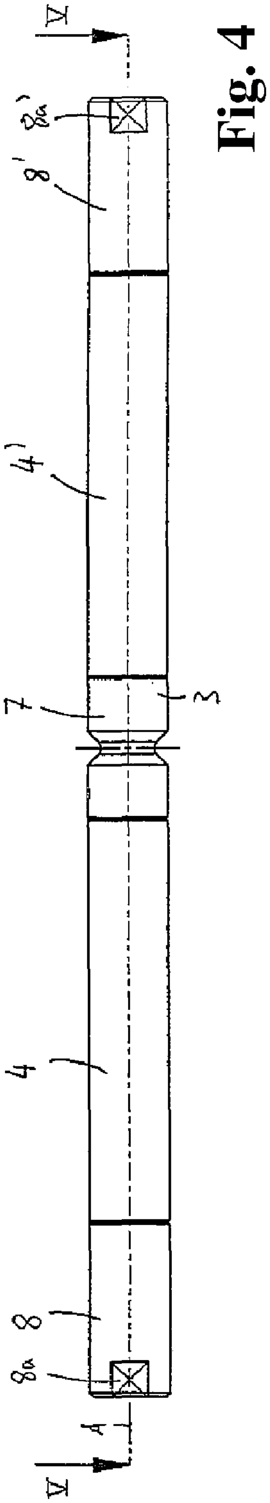
FIG. 4 is a representation of a side view of a hinge bolt according to FIG. 2.

The hinge bolt of the apparatus according to the present invention is configured in multiple parts. It comprises at least one flux element that is embodied as a prefabricated structural component. This is the structural component that conducts, by itself or for the most part by itself, the magnetic flux between the primary coil and the secondary coil. This flux element is prefabricated. This means that it does not first have to be casted, molded or formed to another existing structural component of the hinge bolt. Prior to the assembly with at least one further part of the hinge bolt, said flux element is rather already available almost completely in the final form thereof.

The hinge bolt according to the present invention furthermore comprises at least one bearing part that serves, by itself or for the most part by itself, to introduce mechanical forces into the hinge bolt and/or to apply mechanical forces by means of the hinge bolt, meaning ultimately the transmission of mechanical forces between the door leaf/window sash and the wall.

Due to the structural assembly in multiple parts, it is possible for the flux element and the bearing piece to be optimized and disposed for implementing different properties, such as a small magnetic resistance in the case of the flux element or a high mechanical load capacity in the case of the bearing piece, in those places where these properties are particularly required. The prefabricated flux element can be manufactured from a material that is particularly suited for the respective purpose of application of the apparatus. If the apparatus is to serve for the transmission of alternating voltage of approximately 50 Hz, the flux element can, for example, be made of a dynamo sheet or comprise the same. If the alternating voltage has a higher frequency, for example, in the kilohertz range, the flux element can made of or comprise amorphous or nanocrystalline bands, or also ferrites.

The manufacture of the flux element is straightforward and cost-effective due to the fact that it is manufactured separately from the further parts of the hinge bolt. It is moreover possible to prepare optimized flux elements together with the further structural components of a hinge bolt for varying purposes of application in the manner of a modular system.

The flux element comprises frontal sides, at least one of which is braced against a mating frontal side of a bearing piece. This results in the bearing piece and the flux element being reliably fixed in place in relation to each other.

In an embodiment of the present invention, the flux element can, for example, be rotationally symmetrical. It is thereby able to have a cross-sectional area that is as large as possible for particularly low magnetic resistance. Disturbing edges of the flux element extending axially on the surface of the hinge bolt, such as conceivably encountered on flux elements that are formed of two semi-shells, are moreover precluded.

To effect the bracing, an embodiment of the hinge bolt envisions at least one tensile element that passes through a central bore in the flux element and that is connected to at least one bearing piece. The diameters of the tensile element and the bore of the flux element therein are provided to be as small as possible so that the flux element has the maximum possible cross-sectional area for minimizing the magnetic resistance. The material that is, for example, used for the tensile element correspondingly has the necessary ultimate tensile strength to achieve the required bracing strength for the respective application.

In an embodiment of the present invention, the tensile element can, for example, be screwed to the at least one bearing piece; this connection can be easily implemented and released in terms of the involved complexity. A desired tensile stress can moreover be achieved by the choice of torque that is used for creating the screwed connection.

The apparatus according to the present invention can also comprise two pairs of coils that are disposed at a distance relative to each other, consisting of a primary and secondary coil respectively. This is the case, for example, when one pair of coils is to serve to transmit electrical power, while the other pair of coils is to serve to transmit electrical signals between the hinge flap and the door leaf/window sash. The hinge bolt can then, for example, comprise two flux elements that are spaced at a distance relative to each other with a center piece there between comprising two mating frontal sides that are oriented away from each other. The flux elements can be adapted with the aid of the respective pair of coils, by means of different sizing and choice of material, to the power, frequency and signal form, etc., that must be transmitted.

To reduce the transmission of impact blows or vibrations from the one flux element to the other flux element, it is, for example, possible to configure the center part with corresponding shock-absorbing properties. To this end, it is possible to provide the center piece made of a material that exhibits shock-absorbing properties, for example, a suitable plastic material.

In an embodiment of the present invention, the center piece can, for example, include a through hole that is traversed by the tensile element, which is screwed to the bearing pieces that form end pieces, so that the two end areas of the hinge bolt have essentially the bearing function and serve for transmitting mechanical forces.

In an embodiment of the apparatus according to the present invention, a threaded extension or a threaded bore can, for example, be provided at least on one flux element on the frontal side, and a complementary threaded bore or a threaded extension can, for example, be provided on the mating frontal side that is oriented toward a bearing piece, whereby the at least one flux element can be screwed to the bearing piece. This embodiment differs from the previously-described embodiment in that no separate tensile element is provided therein, and that the bracing of the frontal side and mating frontal side in relation to each other is achieved instead by screwing the threaded extension into the threaded bore. The strength of the bracing and/or the value of the compressive force therein by which the frontal side and the mating frontal side are disposed against each other can be determined, in turn, by presetting the torque that is applied in the screw-in step.

If the hinge bolt is to be suitable for an apparatus having two pairs of coils, the hinge bolt here too comprises two flux elements that are disposed at a distance relative to each other, and which distance is defined by a center piece. The center piece includes two mating frontal sides that are oriented away from each other, wherein, complementary threaded bores or threaded extensions are provided on the mating frontal sides with regard to the threaded extensions or threaded bores of the flux elements so that the flux elements can be screwed into a center piece. The center piece can also be configured such that it has shock-absorbing properties.

With both embodiments, it can be advantageous for the at least one bearing piece to have a centering area and the at least one flux element to have a mating centering area, so that the bearing piece and the flux element are thereby reliably positioned within the allowable tolerances relative to each other and without any need for additional steps that go beyond mere assembly.

If the hinge bolt comprises two flux elements that are disposed at a distance relative to each other that is defined by a center piece, the center piece can, for example, also include mating centering areas for respectively one centering area of a flux element.

To avoid a compromise of the inductive coupling of the primary and secondary coils by unnecessary losses due to leakage, the bearing pieces can, for example, be made of a material with low permeability. This is another measure that reduces the susceptibility to interference by external magnetic fields that may be in effect with regard to the bearing pieces.

If available, the center piece can, for example, be manufactured of a material with low permeability to reduce any undesired magnetic coupling of the two flux elements.

The present invention also relates to a hinge bolt, taken by itself, for an apparatus of the kind as described above. The materials that are used for the individual parts can, for example, not be assembly components that are combined from different materials, such as a metal core that is surrounded by a highly permeable material. Each part can instead, for example, be made of a single commercially available material or of a single commercially available material combination.

The present invention will be illustrated in further detail below based on the embodiments as shown in the drawings.

The apparatus that is schematically depicted in FIG. 1 and designated as a whole with the reference numeral 100 comprises two pairs of primary and secondary coils, namely a primary power coil 1 and a secondary power coil 2, as well as a signal transmission coil 9 and a signal transmission coil 10 that is inductively coupled to the former. The hinge bolt 3, 103 passes through all coils. The hinge bolt 3, 103 has a longitudinal center axis A. The hinge bolt 3, 103 is, contrary to the rest of the apparatus 100, not shown by way of a longitudinal section.

The hinge bolt 3, 103 pivotably connects the hinge flap parts 14, 15, 16 about a hinge axis S. The apparatus 100 is structured in a manner similar to a three-part hinge flap. It can be disposed between door leaf/window sash and frame, in addition to the hinge flaps of a construction known in the art and that absorbs the load of the leaf/sash, or instead of such a hinge flap. The apparatus 100 is thus correspondingly also able to absorb mechanical forces, particularly forces that must be transmitted between the wall and door leaf/window sash.

The hinge bolt 3, 103 is structurally designed in multiple parts. It comprises two flux elements 4, 4'; 104, 104' that are disposed at a distance relative to each other, and the spacing there between being defined by the center piece 7, 107. The dimensions of the flux elements 4, 4'; 104, 104' are such that they substantially completely fill out the space that is enclosed by the coils 1, 2; 9, 10, however without extending beyond the same.

The hinge bolt 3, 103 moreover comprises the bearing pieces 8, 8'; 108, 108' that extend from the two flux elements 4, 4'; 104, 104' toward the outside and that serve to support the hinge bolt 3, 103 inside the hinge flap parts 14, 16 as well as to transmit mechanical forces. The center piece 7, 107 serves for supporting the hinge bolt in the hinge flap part 15.

The hinge bolt 3, 103 is completely constructed of single parts, as will be explained in further detail below based on FIGS. 2 to 13. The flux elements 4, 4'; 104, 104' are made of soft-magnetic material, for example, ferrite. The center piece 7, 107 is made of a material of low permeability for the magnetic decoupling of the flux elements 4, 4'; 104, 104' and the bearing pieces 8, 8'; 108, 108'.

To provide the hinge bolt 3, 103 with shock-absorbing properties that at least reduce the transmission of, for example, vibrations between the flux elements 4, 4'; 104, 104' the center piece 7, 107 can be made of a shock-absorbing material, for example, of plastic. For fastening in the direction of the hinge axis S, it includes a waisted area 13 where a stud engages, which is not shown in the drawing.

An embodiment of the hinge bolt will be explained in further detail based on FIGS. 2 to 7. This embodiment comprises a tensile element 6 that is configured in a rod-like manner and provided with a thread 6' on both ends. The tensile element 6 can also be formed in the manner of a continuous threaded rod. The threads 6' engage, as shown, particularly in FIG. 6, in related complementary internal threads 6" of the bearing pieces 8, 8'. This means that the tensile element 6 is screwed into the bearing pieces 8, 8'. Said element exercises tensile forces on the bearing pieces 8, 8' such that the same come to rest, by the mating frontal sides 17, 17', against the frontal sides 18, 18' of the flux elements 4, 4' (see FIG. 3), which means that the frontal sides 18, 18' of the flux element 4, 4' are braced against the mating frontal sides 17, 17' of the bearing pieces 8, 8'.

The tensile element 6 further causes the frontal sides 19, 19' that are provided on the other end of the flux elements 4, 4' to be braced against the mating frontal sides 20, 20' of the center piece 7.

The amount of the tensile stress that is created by the tension anchor can be influenced by the torque that is used to tighten the bearing pieces 8, 8'. To allow for the placement of a suitable driving tool, they comprise the wrench surfaces 8*a*, 8*a'*.

Figure 5:
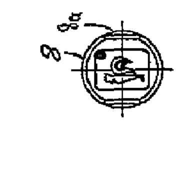
FIG. 5 is a representation of a frontal view of a hinge bolt according to FIG. 2.

The internal threads 6" can be configured as self-rolling, whereby it is only necessary to provide cylinder bores in the bearing pieces 8, 8'. The tensile element 6 is made of a material that is able to accommodate high tensile stresses, such as, for example, an iron alloy. As shown in FIG. 5, this way, it is possible to provide a tensile element with a relatively small diameter, such as, for example, smaller than half the diameter of the hinge bolt. In the shown embodiment, the diameter of the tensile element is minimally larger than one third of the diameter of the hinge bolt 3. Due to the relatively small diameter, it is possible for the flux elements 4, 4' to take up a relatively large cross-sectional area. This results in a particularly small magnetic resistance and a highest-possible inherent stability of the flux elements 4, 4'.

If the bearing pieces 8, 8' are only screwed to the tensile element 6 tightly enough that the same is not stretched, due to the tensile stress, to the limit of the elastic deformation capacity thereof, the hinge bolt 3 has, particularly when coupled with the shock-dampening structural design of the center piece 7, an overall shock-absorbing effect. The center hinge flap part 15, which is regularly fastened to the door leaf/window sash, is in fact able to shift under the effect of external forces in terms of the extent of deformation relative to the hinge flap parts 14, 16, which are regularly fastened to the wall.

Figure 6:
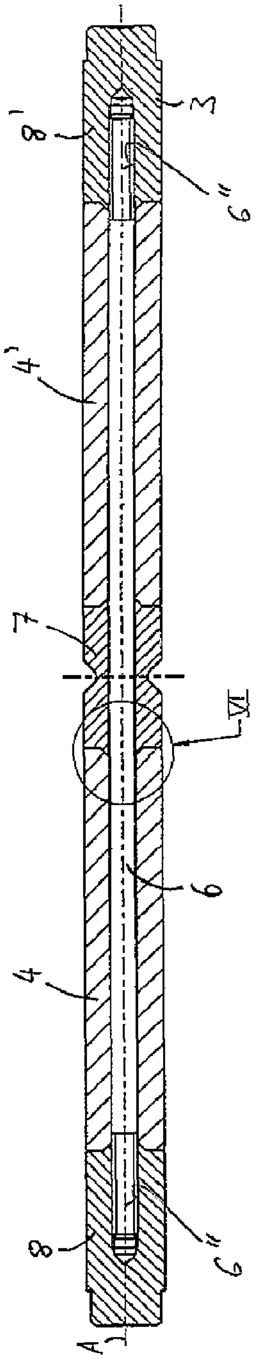
FIG. 6 is a representation of a sectional view of a hinge bolt according to FIG. 4.
Figure 7:
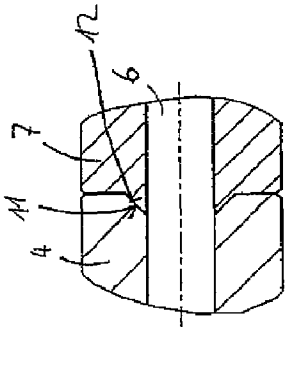
FIG. 7 is a representation of an enlarged view of a detail from FIG. 6.
Figure 8:
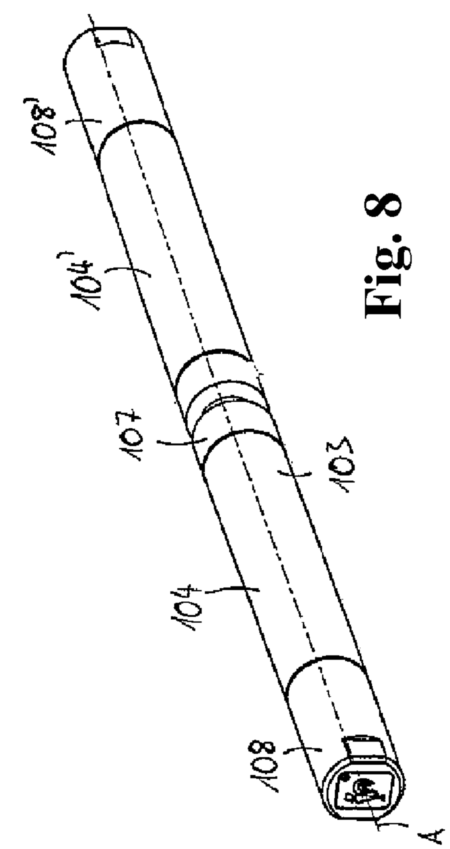
FIG. 8 is a representation of a perspective view of an embodiment of a hinge bolt of an apparatus according to the present invention.

As depicted, in particular, in FIGS. 6 and 7, the flux elements 4, 4' are provided with approximately frustroconical chamfers 11 on both frontal sides 18, 19; 18', 19' thereof that operate in conjunction with the complementary chamfers 12 provided on the center piece 7 and/or on the bearing pieces 8, 8' in a self-centering manner, thereby forming centering surfaces and mating centering surfaces for the bearing pieces 8, 8', the flux elements 4, 4' and the center piece 7.

The hinge bolt 3 is easily mounted during manufacturing; it is also easily mounted by the operator who inserts the hinge bolt inside the apparatus 100. There are no ferritic semi-shells, nor any glue points. The hinge bolt has a straightforward structural design and includes an automatic tolerance compensation inside the length of the structural assembly, due to the elastic properties of the center piece 7 and the tensile element 6. Owing to the self-centering structural components, it is always centrally mounted and therefore easily installed on the hinge flap and/or the apparatus. It is very easily adjustable to further dimensional and coil situations (modular system). Due to the small magnetic resistance of the flux elements 4, 4', the inductive coupling action has been optimized. Due to the shock-absorbing effect of the center piece 7, which can comprise a plastic part, the undesired transmission of vibration or impact blows has been reduced between the flux elements 4, 4' and the resilience of the hinge bolt 3 has been enhanced. The small diameter of the tensile element permits for the effective use of the center part, has the shock-absorbing effect. Screwing the tensile element 6 into the bearing pieces 8, 8' renders the structural assembly of the hinge bolt 3 flexible because the flux elements 4, 4' as well as the center piece 7 can be easily replaced.

A second embodiment of a hinge bolt, as depicted in FIGS. 8 to 13, is designated overall by the reference numeral 103; this hinge bolt that can be used as an alternative to the first embodiment of the hinge bolt 3. Component parts having a corresponding functionality in the second embodiment are identified by the same reference numbers plus 100.

Figure 9:
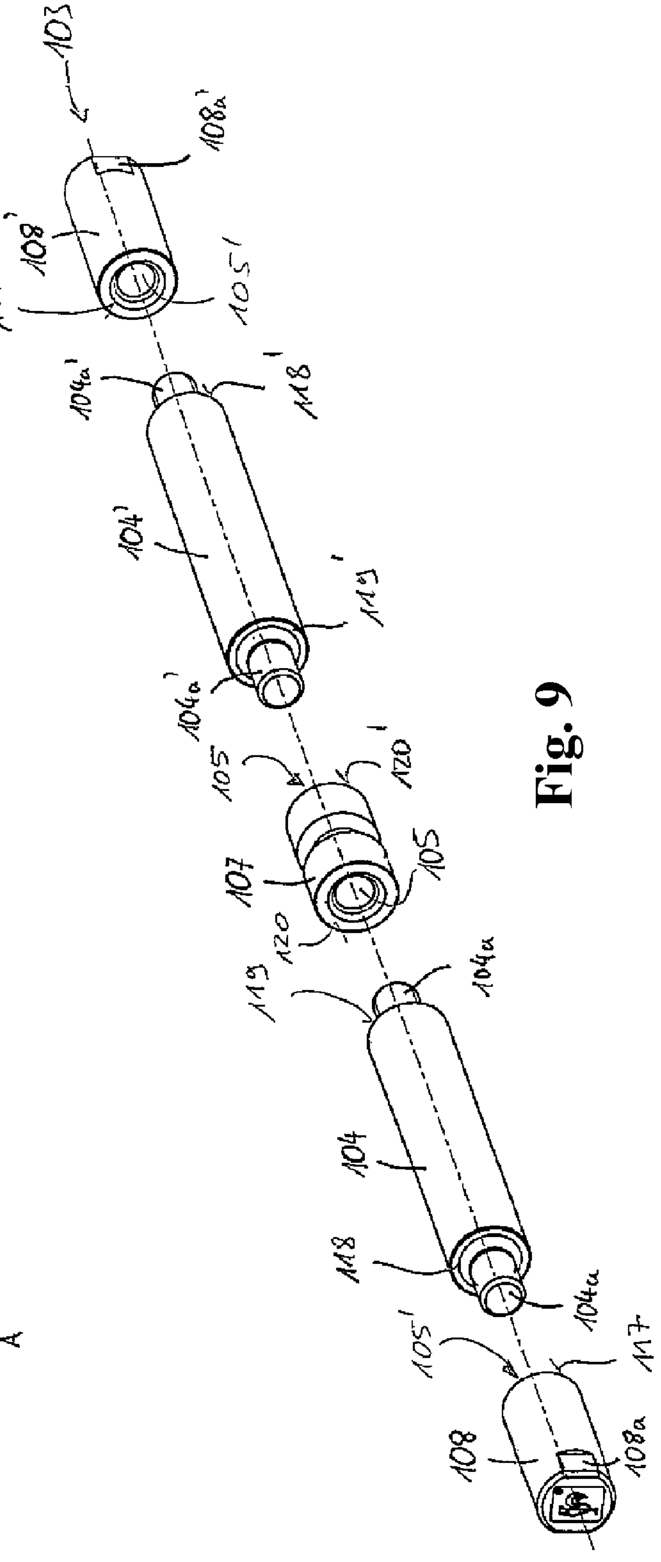
FIG. 9 is a view according to FIG. 8, however, seen as an exploded view.
Figures 10, 11, 12, 13:
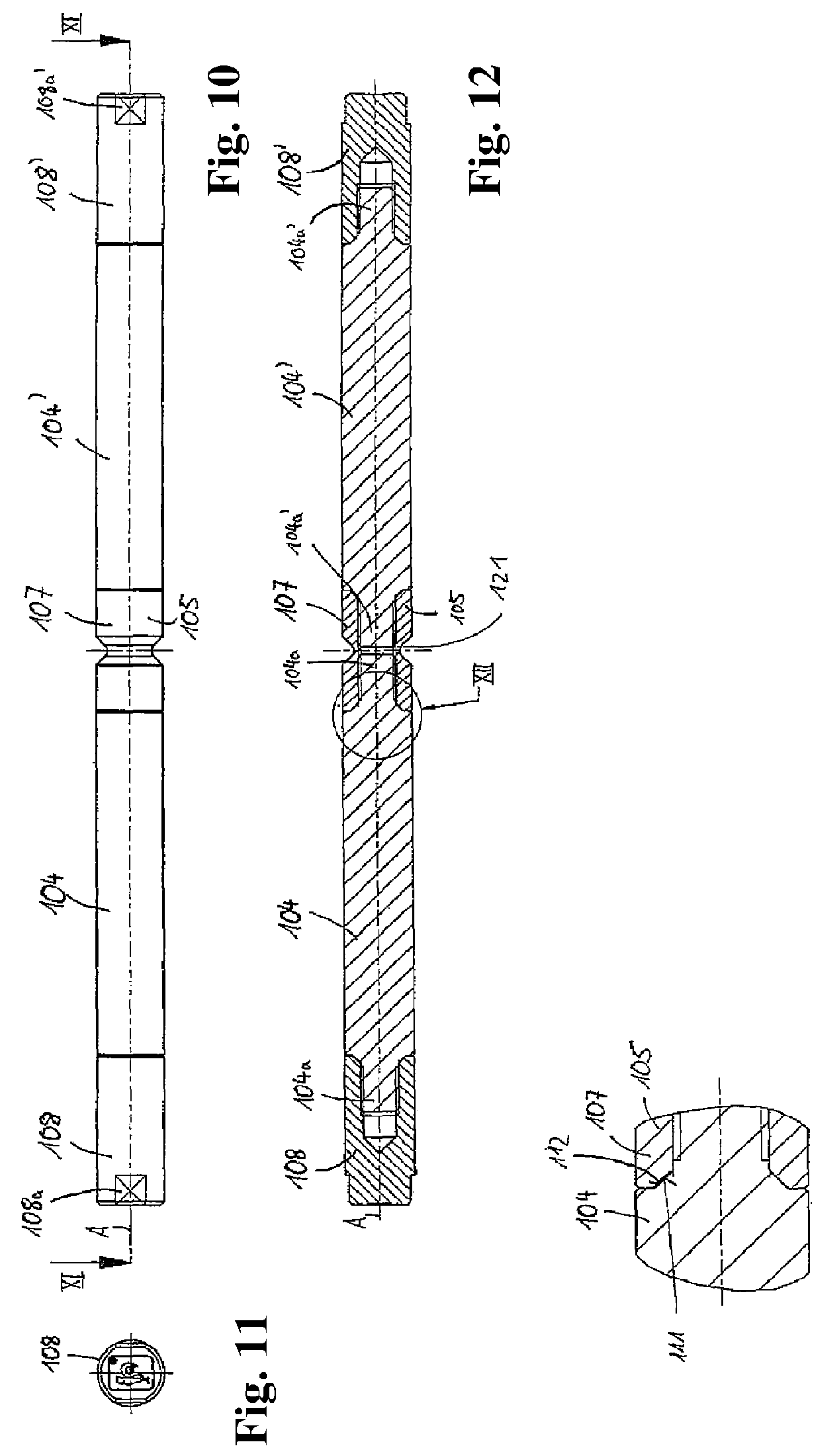
FIG. 10 is a representation of a side view of a hinge bolt according to FIG. 8.
FIG. 11 is a representation of a frontal view of a hinge bolt according to FIG. 10.
FIG. 12 is a representation of a sectional view of a hinge bolt according to FIG. 10.
FIG. 13 is a representation of an enlarged detail from FIG. 12.

In contrast to the first embodiment, the hinge bolt 103 does not include a tensile element. Rather, two flux elements 104, 104' are provided that include the threaded extensions **104*a*, 104*a'* at the two frontal ends thereof. These threaded extensions 104*a*, 104*a'* engage in the complementary threaded bores 105, 105', which are provided in the bearing pieces 108, 108' and the center piece 107 (FIG. 9). The bearing pieces 108, 108' include wrench areas 108*a*, 108*a'*. As seen in FIG. 12, the flux elements 104, 104', in turn, do not make contact with each other; instead, an air gap 121 is provided there between to improve the decoupling operation of the two flux elements 104, 104' from each other and to allow for a minimal relative displacement of the two flux elements 104, 104', and thereby the bearing pieces 108, 108' toward each other for purposes of shock absorption. To this end, the center piece 107 includes again shock-absorbing properties and low permeability. The flux elements 104, 104'** are made of a soft-ferromagnetic material, for example, ferrite.

All parts 104, 104', 105, 107, 108, 108' of the hinge bolt 103 are screwed to each other. This embodiment also envisions the use of chambers 111, 112 that cause the structural components to center themselves, when they are screwed together.

It is understood that, in the alternative, the threaded extensions can also be embodied on the bearing and center pieces, whereby the complementary threaded bores can be implemented in the flux elements.

In the assembled state of the apparatus according to the present invention, the hinge bolt defines the hinge axis S, meaning the longitudinal axis A thereof and the hinge axis S are congruent.

The present invention is not limited to embodiments described herein; reference should be had to the appended claims.

LIST OF REFERENCE NUMERALS

100 Apparatus
1 Primary power coil
2 Secondary power coil
3, 103 Hinge bolt
4, 4'; 104, 104' Flux elements
**104*a*, 104*a'*** Threaded extensions
6 Tensile element
6' Thread
6" Internal thread
7, 107 Center piece
8, 8'; 108, 108' Bearing pieces
**8*a*, 8*a'*; 108*a*, 108*a'*** Wrench surfaces
9 Signal transmission coil
10 Signal transmission coil
11, 111 Chamfers
12, 112 Chamfers
13 Waist
14 Hinge flap part
15 Hinge flap part
16 Hinge flap part
17, 17'; 117, 117' Mating frontal sides
18, 18'; 118, 118' Frontal sides
19, 19'; 119, 119' Frontal sides
20, 20'; 120, 120' Mating frontal sides
105, 105' Threaded bore
121 Air gap
A Longitudinal center axis of the hinge bolt
S Hinge axis

What is claimed is:

1. An apparatus for a contactless transmission of electrical energy between a wall and a door leaf/window sash fastened to the wall in an articulated fashion via hinges about a hinge axis, the apparatus comprising:
- a primary coil configured to be fastened to the wall;
- a secondary coil configured to be fastened to the door leaf/window sash;
- a hinge bolt configurable as a magnetic flux conduction body between the primary coil and the secondary coil, the hinge bolt comprising:
  - at least one flux element provided as a prefabricated structural component, the at least one flux element comprising at least one frontal side; and
  - at least one bearing piece comprising a mating frontal side,
  - wherein, the at least one frontal side of the at least one flux element is configured to brace against the mating frontal side of the at least one bearing piece; and
- a tensile element which is configured to pass through the at least one flux element and to be connected to the at least one bearing piece;
- wherein,
- the tensile element is screwed to the at least one bearing piece,
- the at least one bearing piece is provided as a first bearing piece and a second bearing piece,
- the first bearing piece and the second bearing piece each being an end piece, and
- the tensile element is screwed to the first bearing piece and to the second bearing piece.

2. The apparatus as recited in claim 1, wherein the at least one bearing piece is manufactured of a material with a low permeability.

3. The apparatus as recited in claim 1, wherein the first bearing piece and the second bearing piece each comprise a wrench surface configured to have a driving tool be placed thereon.

4. The apparatus as recited in claim 1, further comprising a center piece comprising a first mating frontal side and a second mating frontal side which are oriented away from each other, wherein the at least one flux element is provided as a first flux element and a second flux element, the first flux element and the second flux element being disposed at a distance relative to each other and being spaced via the center piece.

5. The apparatus as recited in claim 4, wherein the center piece has a shock-absorbing property.

6. The apparatus as recited in claim 4, wherein the center piece is manufactured of a material with a low permeability.

7. The apparatus as recited in claim 4, wherein the center piece further comprises centering areas, and the at least one flux element further comprises flux element centering areas, each of the centering areas being configured to mate with one respective flux element centering area.

8. The apparatus as recited in claim 1, wherein the at least one flux element further comprises at least one threaded extension or threaded bore on the at least one frontal side, and the at least one bearing piece braced against the at least one flux element further comprises a threaded bore or a threaded extension on the mating frontal side which is configured to compliment the respective at least one threaded extension or threaded bore so that the at least one flux element can be screwed to the at least one bearing piece.

9. The apparatus as recited in claim 8, wherein the at least one bearing piece comprises a wrench surface configured to have a driving tool be placed thereon.

10. The apparatus as recited in claim 8, further comprising a center piece comprising a first mating frontal side and a second mating frontal side which are oriented away from each other, each of the first mating frontal side and the second mating frontal side comprising a threaded bore or a threaded extension, wherein, the at least one flux element is provided as a first flux element and a second flux element, each of the first flux element and the second flux element comprising a respective threaded bore or threaded extension, the threaded bore or threaded extension of the respective first mating frontal side and second mating frontal side being configured to compliment the respective threaded bore or threaded extension of the respective first flux element and second flux element so that the first flux element and the second flux element can be screwed to the center piece.

11. The apparatus as recited in claim 10, wherein the center piece has a shock-absorbing property.

12. The apparatus as recited in claim 10, wherein the at least one bearing piece comprises a bearing piece centering area, and the at least one flux element comprises a flux element centering area, the bearing piece centering area and the flux element centering area each being configured to mate with each other.

13. The apparatus as recited in claim 12, wherein the center piece further comprises centering areas, each of the centering areas being configured to mate with one respective flux element centering area.

14. The apparatus as recited in claim 8, wherein the at least one bearing piece is manufactured of a material with a low permeability.

15. The apparatus as recited in claim 8, wherein the center piece is manufactured of a material with a low permeability.

16. A hinge bolt which can be configured to serve as a magnetic flux conduction body between a primary coil and a secondary coil, the hinge bolt comprising:

at least one flux element provided as a prefabricated structural component, the at least one flux element comprising at least one frontal side;

at least one bearing piece comprising a mating frontal side; and a tensile element which is configured to pass through the at least one flux element and to be connected to the at least one bearing piece, wherein, the at least one frontal side of the at least one flux element is configured to brace against the mating frontal side of the at least one bearing piece, the tensile element is screwed to the at least one bearing piece, the at least one bearing piece is provided as a first bearing piece and a second bearing piece, the first bearing piece and the second bearing piece each being an end piece, and the tensile element is screwed to the first bearing piece and to the second bearing piece.

17. An apparatus for a contactless transmission of electrical energy between a wall and a door leaf/window sash fastened to the wall in an articulated fashion via hinges about a hinge axis, the apparatus comprising:

a primary coil configured to be fastened to the wall;

a secondary coil configured to be fastened to the door leaf/window sash;

a hinge bolt configurable as a magnetic flux conduction body between the primary coil and the secondary coil, the hinge bolt comprising:

at least one flux element provided as a prefabricated structural component, the at least one flux element comprising at least one frontal side; and at least one bearing piece comprising a mating frontal side, wherein, the at least one frontal side of the at least one flux element is configured to brace against the mating frontal side of the at least one bearing piece; and a center piece comprising a first mating frontal side and a second mating frontal side which are oriented away from each other, wherein, the at least one flux element is provided as a first flux element and a second flux element, the first flux element and the second flux element being disposed at a distance relative to each other and being spaced via the center piece, and the center piece has a shock-absorbing property.

18. The apparatus as recited in claim 17, wherein the at least one bearing piece is manufactured of a material with a low permeability.

19. The apparatus as recited in claim 17, further comprising a tensile element which is configured to pass through the at least one flux element and to be connected to the at least one bearing piece.

20. The apparatus as recited in claim 19, wherein the tensile element is screwed to the at least one bearing piece.

21. The apparatus as recited in claim 20, wherein the at least one bearing piece is provided as a first bearing piece and a second bearing piece, the first bearing piece and the second bearing piece each being an end piece, and the tensile element is screwed to the first bearing piece and to the second bearing piece.

22. The apparatus as recited in claim 21, wherein the first bearing piece and the second bearing piece each comprise a wrench surface configured to have a driving tool be placed thereon.

23. The apparatus as recited in claim 17, wherein the center piece is manufactured of a material with a low permeability.

24. The apparatus as recited in claim 17, wherein the center piece further comprises centering areas, and the at least one flux element further comprises flux element centering areas, each of the centering areas being configured to mate with one respective flux element centering area.

25. The apparatus as recited in claim 17, wherein the at least one flux element further comprises at least one threaded extension or threaded bore on the at least one frontal side, and the at least one bearing piece braced against the at least one flux element further comprises a threaded bore or a threaded extension on the mating frontal side which is configured to compliment the respective at least one threaded extension or threaded bore so that the at least one flux element can be screwed to the at least one bearing piece.

26. The apparatus as recited in claim 25, wherein the at least one bearing piece comprises a wrench surface configured to have a driving tool be placed thereon.

27. The apparatus as recited in claim 25, further comprising a center piece comprising a first mating frontal side and a second mating frontal side which are oriented away from each other, each of the first mating frontal side and the second mating frontal side comprising a threaded bore or a threaded extension, wherein, the at least one flux element is provided as a first flux element and a second flux element, each of the first flux element and the second flux element comprising a respective threaded bore or threaded extension, the threaded bore or threaded extension of the respective first mating frontal side and second mating frontal side being configured to compliment the respective threaded bore or threaded extension of the respective first flux element and second flux element so that the first flux element and the second flux element can be screwed to the center piece.

28. The apparatus as recited in claim 27, wherein the center piece has a shock-absorbing property.

29. The apparatus as recited in claim 27, wherein the at least one bearing piece comprises a bearing piece centering area, and the at least one flux element comprises a flux element centering area, the bearing piece centering area and the flux element centering area each being configured to mate with each other.

30. The apparatus as recited in claim 29, wherein the center piece further comprises centering areas, each of the centering areas being configured to mate with one respective flux element centering area.

31. The apparatus as recited in claim 25, wherein the at least one bearing piece is manufactured of a material with a low permeability.

32. The apparatus as recited in claim 25, wherein the center piece is manufactured of a material with a low permeability.

33. A hinge bolt which can be configured to serve as a magnetic flux conduction body between a primary coil and a secondary coil, the hinge bolt comprising:

at least one flux element provided as a prefabricated structural component, the at least one flux element comprising at least one frontal side;

at least one bearing piece comprising a mating frontal side; and a center piece comprising a first mating frontal side and a second mating frontal side which are oriented away from each other, wherein, the at least one frontal side of the at least one flux element is configured to brace against the mating frontal side of the at least one bearing piece, the at least one flux element is provided as a first flux element and a second flux element, the first flux element and the second flux element being disposed at a distance relative to each other and being spaced via the center piece, and the center piece has a shock-absorbing property.

* * * * *